Dec. 13, 1955

C. E. WILLIAMS 2,726,413

METATARSAL ARCH SUPPORT LOCATING
DEVICE AND SECURING MEANS

Filed Sept. 3, 1953

INVENTOR.
CLARENCE E. WILLIAMS
BY
Justicle Macklin
ATT'Y

Dec. 13, 1955
C. E. WILLIAMS
2,726,413
METATARSAL ARCH SUPPORT LOCATING
DEVICE AND SECURING MEANS
Filed Sept. 3, 1953
3 Sheets-Sheet 2
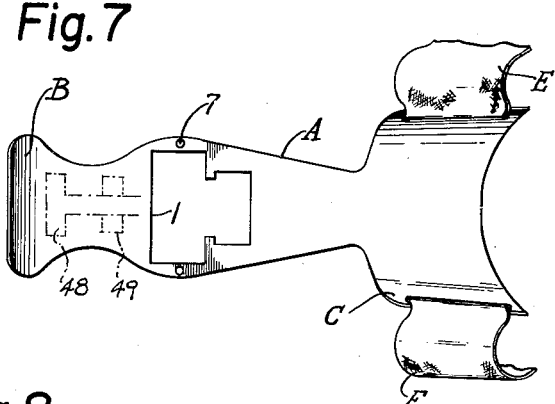
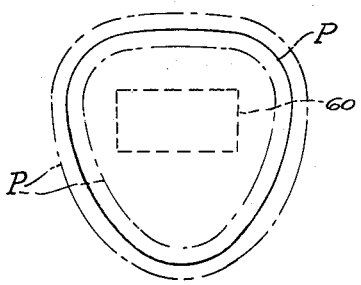
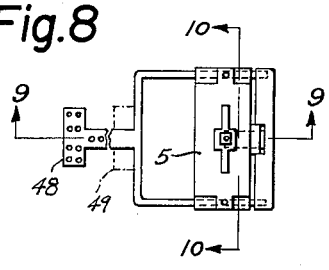
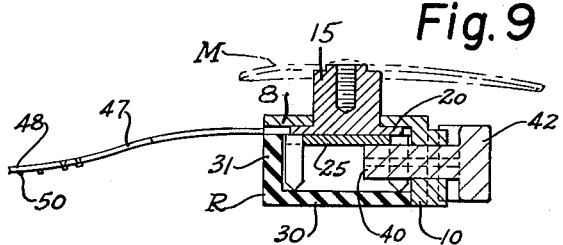
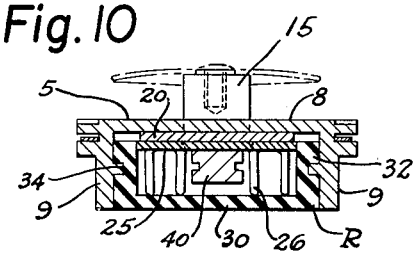
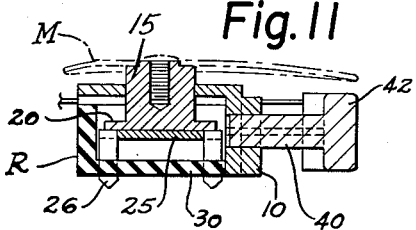
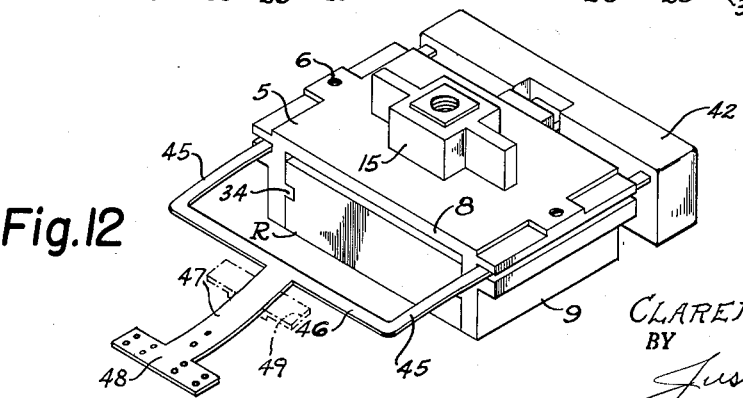
INVENTOR.
CLARENCE E. WILLIAMS
BY
Justin W. Macklin
ATTY Dec. 13, 1955
C. E. WILLIAMS
2,726,413
METATARSAL ARCH SUPPORT LOCATING
DEVICE AND SECURING MEANS
Filed Sept. 3, 1953
3 Sheets-Sheet 3
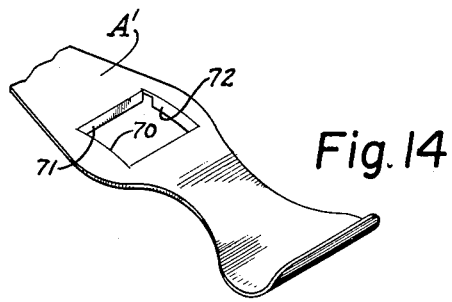
Fig. 14
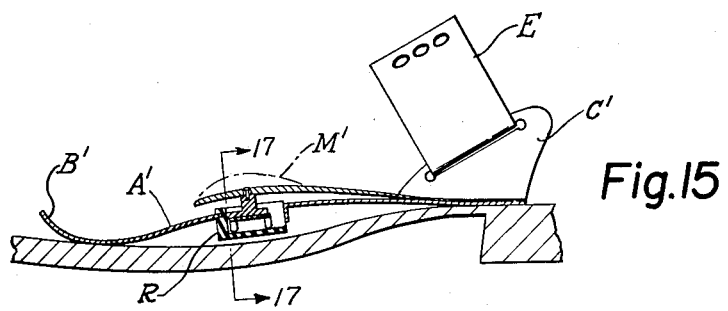
Fig. 15
Fig. 17
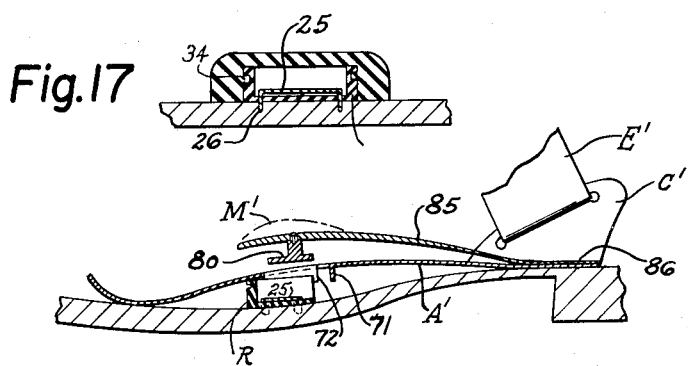
Fig. 16
INVENTOR.
CLARENCE E. WILLIAMS
BY
Justin W. Macklin
ATTY

United States Patent Office 2,726,413
Patented Dec. 13, 1955

2,726,413

METATARSAL ARCH SUPPORT LOCATING DEVICE AND SECURING MEANS

Clarence E. Williams, Cleveland, Ohio

Application September 3, 1953, Serial No. 378,379

9 Claims. (Cl. 12—103)

This invention relates to means for correctly locating and for securely affixing metatarsal arch-supporting pads in shoes and contemplates the use of a fixed anchoring device to which different metatarsal arch-supporting pads may be interchangeably secured.

In my prior Patent No. 2,020,045, granted November 5, 1935, is shown and disclosed an "Instrument for Locating the Metatarsal Arch" and which instrument also enabled the location of corrective arch-supporting pads within the shoe of the wearer, in the proper position for the correction provided by the support.

In that patent emphasis was made of the desirability of locating the metatarsal arch-supporting pad with correct relation to the individual foot and, then in correspondingly proper location within the shoe, for positioning the pad with relation to the high point of the metatarsal arch in both a transverse and longitudinal direction with respect to the os calcis bone.

It was found that the use of the invention disclosed in that patent attained the advantages described, but that a degree of skill was required to correctly use the invention to attain the most satisfactory results. However skillfully that device was used it was necessary to carefully position and glue, or similarly secure, an arch-supporting pad to the shoe, in correct location as indicated by a mark within the shoe, which mark in turn was located and made by the instrument fitted to and suiting an individual foot.

Furthermore, for proper correction of foot ailments resulting from the lowering of the metatarsal arch, and those flowing from related irregularities of bone positions, it is often desirable to try different shapes, sizes, and thicknesses of the arch-supporting pads, and I provide for such trial fitting without removal of previously glued-in pads.

The present invention contemplates attaining all of the highly desirable results set forth in my prior patent and in addition thereto providing simple, easy to use, accurate arch-locating and fitting means which may be cheaply manufactured, durable in use, and by which the following specific additional advantages, among others, may be attained.

My present invention constitutes a device which may be fitted to the bottom of the foot and may quickly and easily be secured in position, precisely locating the individual metatarsal arch and which, when in this correct position may be thrust into the shoe carrying with it a locating and anchoring means to which an arch-supporting pad may be securely but removably attached.

An object of the invention is to so arrange the anchoring means so that it may be carried under an arch locating head or convex cap-like member and when the shoe is fitted to the foot of the wearer with the locating and the pad-positioning means therein, the wearer may put his weight down by stepping normally upon the foot, thrusting the cap downwardly and causing securing prongs to penetrate the sole of the shoe and thus securely fix the anchoring means to the inside of the shoe. A resulting advantage is that after so securing the pad-anchoring member to the shoe, the foot may be withdrawn with the locating and carrying device, leaving the pad anchor fixed in its correct position.

A further object contemplates the provision of supporting pads having coacting attaching means adapted to engage and securely hold the pad to the anchoring means. To this end the resilient pads are provided with rigid sockets on the under side, having coacting latching shoulders, or like securing means, and which rigid socket portions extend only part way through the vertical height or thickness of the resilient material of the arch-supporting pads. With this arrangement the use of glue or other adhesive may not be needed for the pads even when in daily use.

It follows that with such an arrangement pads of different transverse area and vertical thickness, and all having uniform anchor-fitting sockets, may be interchangeably firmly secured to the properly located arch anchor in any individual shoe. Obviously this affords an important advantage in that the supporting pads may be changed to best suit the wearer's comfort and at the same time accomplish corrective results.

More specific objects include the provision of the locating and anchor carrying device of such design that when fitted to the foot it conforms to the contour of the foot below the metatarsal heads and which also has somewhat yielding sidewing portions embracing the foot at either side, and slightly forwardly of the os calcis bone, while the pressure cap and anchor prong driving member is precisely fitted beneath and correctly located with relation to the high portion of the metatarsal arch.

Further objects include so arranging the device that the pad anchoring device may be firmly held in position, after such fitting and positioning of the pressure cap, and may be carried into the shoe, while means are provided for so supporting the anchor securing means and which supporting means may be disengaged to permit driving of the prongs into the sole of the shoe by weight of the wearer. When so disengaged and after driving of the anchoring prongs the locating and anchor driving device may be readily removed from the shoe as the foot is withdrawn therefrom.

It should be understood that various modifications of the present invention may be made without departing from the spirit and intent thereof, as defined in the appended claims. The accompanying drawings illustrate a preferred form and a modification thereof.

In the drawings:

Fig. 7 is a plan view of the main rigid member of the anchoring device with associated parts removed;

Fig. 8 is a plan view of the anchor fixing device and releasing means, with the arch fitting and pressure cap removed;

Fig. 9 is a longitudinal vertical section on a plane indicated by the line 9—9 of Fig. 8;

Fig. 10 is a transverse section taken on a plane indicated by the line 10—10 of Fig. 8;

Fig. 11 is a section on the same plane as Fig. 9 showing the parts in a position at the beginning of the movement pressing the anchoring prongs into the shoe;

Fig. 12 is a perspective view of the assembly of the anchor driving device with the pressure cap removed;

Figure 1:
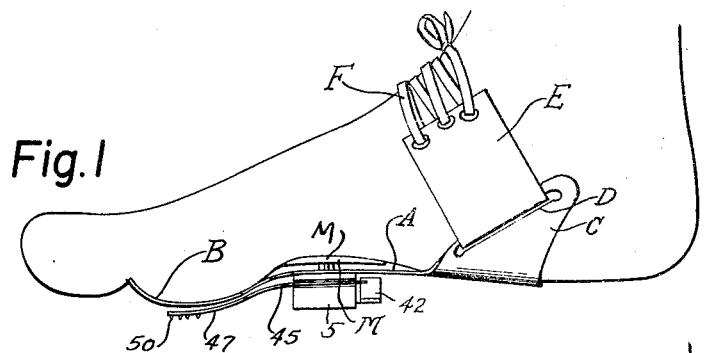
Fig. 1 is an elevation of a human foot showing one form of my locating and anchor affixing means fitted and attached thereto.
Figure 2:
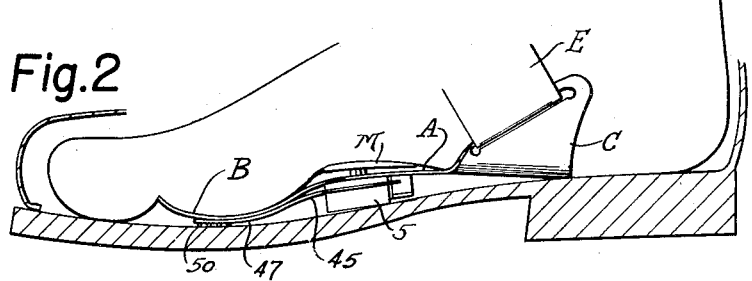
Fig. 2 is a similar view showing the foot being thrust into a shoe, partially illustrated in section.
Figure 3:
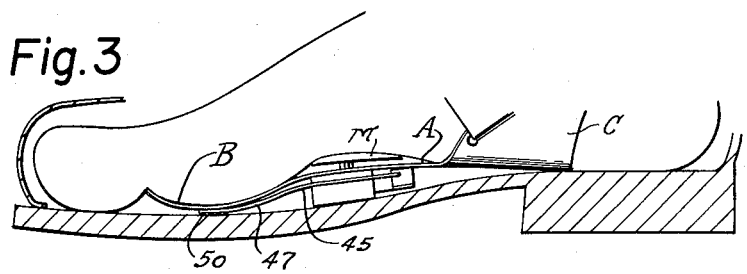
Fig. 3 is a view similar to Fig. 2 showing the foot in shoe in substantially the position as when worn and with the parts in the positions before effecting the fixing of the anchor.
Figure 4:
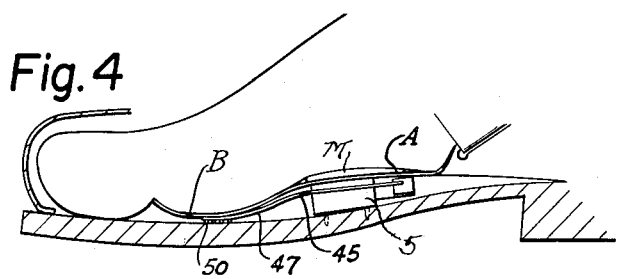
Fig. 4 is a similar view showing the action of pressing downwardly by the weight of the wearer to effect anchoring, and after the action of an unlatching means having released the anchoring block and securing prongs carrying device.

It is to be understood that for convenience of illustration the relative vertical height of the parts shown in Figs. 8 to 12 has been somewhat exaggerated for convenience of illustration and that, of course, these parts may be designed to occupy less vertical space under the foot than there appears.

Fig. 13 is a plan view of a pad fitted to the anchor with broken lines indicating different sizes of pads;

In Figs. 14 to 17 is illustrated a modified form of the device; Fig. 14 being a perspective view of the rigid plate-like element fitted beneath the foot and Figs. 15, 16, and 17 being sectional views illustrating the use of this somewhat simplified anchor-fixing and pad-securing means.

The arrangement shown in Figs. 1 to 12 may now be described more in detail by the use of reference characters. As there shown, a metallic thin plate-like structure comprises a longitudinal portion A fitting beneath the foot and having a curved forward portion B adapted to closely fit the foot beneath the metatarsal heads and extending rearwardly toward the os calcis, and at the rearward portion, it is shown as provided with upwardly extending wings C for embracing the sides of the foot. These wings may be provided with slots D or other convenient means for attaching broad flexible straps E which may be tied by laces F or otherwise tightly secured in embracing position on the foot. These parts comprise a locating and securing rigid foot-fitting carrier to which may be attached a metatarsal arch coacting and locating means and its cooperative pad anchor locating and securing means.

Referring particularly to Figs. 7 to 12, the plate A is shown as having a widened portion providing for an opening 1 adapted to receive and fit the upper portion of a carrier block 5 which is provided with threaded openings 6 for receiving screws passing through holes 7 at either side of the main opening 1.

The carrier block 5 comprises a top wall 8, side walls 9, and a rear wall 10, providing a downwardly opening rectangular space which may receive a pad anchor and carry it into the shoe and which when secured in the shoe may remain in position while the open forward side of the carrier block member 5 permits the block 5 to be withdrawn with the carrier device and with the locator still secured to the foot.

A vertical slide has a portion 15 projecting upwardly through a correspondingly shaped guide opening in the top wall 8. The upper portion of the part 15 is arranged to receive and rigidly carry the metatarsal arch-locating and driving cap M which may be rigidly secured to this slide member 15. The slide member 15 has a driving portion in the form of an enlarged head 20 which may be substantially coextensive with a plate 25 having a plurality of sharp downwardly extending prongs 26. The anchoring member R is preferably made of resilient material such as rubber or synthetic resilient plastic and comprises a bottom 30, front and side walls 31 and 32 respectively, and which is adapted to fit within the box-like block 5, and have its open side toward the wall 10. To secure it in that position, I may employ projections or horizontal ribs fitting grooves as indicated at 34, serving to hold this resilient member R within the member 5, while the foot with the locating device members A and strap E and associated parts are firmly secured to the foot in the proper arch-locating position and while the foot is being thrust in the shoe.

The plate 25 may be held in its upward position as shown in Fig. 10 by a supporting tongue 40 slidably extending through the guide opening formed in the rear wall 10 which is thickened to afford the horizontal support for the inner portion of the tongue when projecting beneath the prong-carrying plate 25. This supporting slide or tongue 40 is shown as rigid with a cross member 42, to which are connected pusher arms 45, shown as connected by a bridging member 46, from which extends a forwardly projecting yielding arm 47 carrying at its forward end a head portion 48 on which are formed sharp but very small downward projections 50.

The arms 45 and member 47 tend to spring downwardly somewhat below the forward curving end B and thus engage and press down on the insole of the shoe, so that as the foot and anchor-locating and fitting device move into the shoe, the block 5 is slid forwardly with relation to the arms 45 and head 48, by reason of the prongs 50 resisting this forward movement. This action results in relatively pushing the member 42 and tongue 40 rearwardly and out from under the plate 25. This pushing movement requires but very slight amount of force.

Assuming that the member M has been carefully located where it presses upwardly and fits in the proper arch location in the foot, and likewise the curved end B of the plate A is fittingly engaging the metatarsal head contour, and that the anchoring member 30 has been placed in position in the hollow block 5 with the prong-carrying plate 25 resting upon the tongue slide 40, and the device having been firmly secured by the lacing F, the foot may now be thrust into the shoe. As the prongs 50 on the head 48 engage the insole resisting forward movement of the head, the tongue 40 is pushed relatively rearwardly, releasing the support under the prong-plate 25 and bringing the parts to the relative position shown in Fig. 11. Small guide clips 49 fixed to the plate A, as shown in broken lines in Figs. 7, 8, and 12, reinforce the arm 47 during this foot entering and releasing action.

The entire weight of the wearer may now be placed upon the arch-fitting convex cap member M, and the driving member 15 with its head 20 will be thrust downwardly causing the prongs 26 to penetrate and become firmly fixed in the sole of the shoe. This series of positions is illustrated progressively in Figs. 1 to 4.

Figure 6:
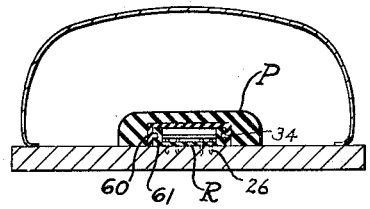
Fig. 6 is a transverse substantially vertical section through the shoe and showing the anchoring device and pad in position.
Figure 5:
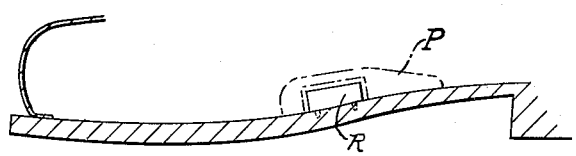
Fig. 5 is a fragmentary view of the forward portion of the sole of the shoe showing the anchoring means and indicating in broken lines the position of a supporting pad fitted thereon.

The foot and locating device can now be withdrawn from the shoe, and the flexible anchor member R remaining thus firmly secured in the shoe. An arch-supporting pad P such as shown in Figs. 5, 6, and 13 is provided with a somewhat rigid rectangular socket 60 moulded therein and which may be fitted over and may firmly engage the walls of the anchor member R. Additional securing means may be effected by tongues 61 fitting the grooves 34 formerly occupied by securing and guiding tongues in the member 5. A suitable shape and size of pad P may be selected from a number of sizes and shapes, each pad having a member 60 adapted to embrace the anchor member R, several illustrative pad sizes being indicated in broken lines in Fig. 13, while one shape is shown in solid lines.

The form shown in Figs. 14, 15, and 16 is simplified principally in that the prong-carrying plate 25 is not supported by the retractable tongue slide 40 but the anchor member R and the plate 25 otherwise secured to the plate A' in such a way as to assure it being carried and slid into properly located position when this plate is secured to the foot as previously described. When in position, the member R is disengaged from the plate A' and the anchor prongs are driven into the sole of the shoe by the weight of the wearer as previously described.

As shown the plate A' is provided, as before, with the forwardly upturned portion B', the upwardly extending embracing wings C' fitted with straps E', as before described, for lacing or tightly securing the devices to the foot.

In a widened portion of the plate member A' is provided a substantially rectangular opening 70 preferably having a downwardly extending flange 71 at the rear edge of the opening, and similar flanges 72 at the sides of the opening, as appears in Figs. 14 and 16. The resilient anchor block R is fitted into this opening with the rear of its side walls engaging the flange 71 and its front wall 31 which is provided with a notch or groove engaging the forward edge of the opening 70. In this position the hollow anchor block member R may be temporarily supported while the locating device is thrust into the shoe and while on the foot of the wearer.

The anchor plate 25 with its prongs 26 may be placed in position within the member R before so positioning the member R in the opening 70.

In this position a driver-head 80 corresponding to the head 20 previously described is arranged to contact and push downwardly upon the prong-carrying plate 25. This driver head 80 is shown as rigidly mounted on a spring-carrying element 85 welded or otherwise secured at 86 to the flat rear portion of the plate A' between the wings C'. Extending forwardly from this securing area, the spring member 85 is arched upwardly, forwardly, and then downwardly, and at its forward end it may be curved to correspond to the arch-locating member M, previously described, and which also acts as the pressure prong driving member as before. A more pronounced convex arch-locating member M' may be mounted on the member 85 above the member 80 as indicated in broken lines in Figs. 15 and 16.

Having placed the anchor member R and pronged plate 25 in position, the arch is located and the device secured to the foot, and then thrust into the shoe. The spring action of the member 85 prevents sufficient downward pressure from being applied to the plate 25 by contact of the foot upon the member M' and the spring member to dislodge the anchor member R from the position shown in Fig. 15. As the device moves with the foot into the shoe the parts may be in substantially the position shown in Fig. 15. The forward edge of the head 80 and flange 71 both push forwardly on the resilient anchor member R until the normal foot position is reached.

Now, as in the form of the invention previously described, the anchor member is in correct position and the whole weight of the person may be applied to the arch-fitting member M' and spring 85, pressing the prongs 26, of the anchor plate into the sole of the shoe. Release of the pressure permits withdrawal of the device with the foot leaving the anchor member in the position shown in Fig. 16. The parts in this position are shown with the spring and member 80 raised to somewhat exaggerated height but, in any event, the member R having been disengaged from the opening 70 and flanges 71 and 72 permits the plate A' to slide rearwardly over the anchor member leaving it firmly fixed in its desired position.

To disengage the anchor member R, the relative movement between this pad anchoring member R and the plate A' needs only to be slightly more than the thickness of the thin plate-like member A', because the notch in the forward wall of the member R is located very close to the top of the front wall of this anchor member. When the pronged plate 25 is driven downwardly, the notch in the member R is disengaged from the forward edge of the opening 70 and the top of this member now stands below the plate A'. Thus, when the foot pressure is released, plate A' may slide over the top of this anchor member. The start of this sliding withdrawing movement is shown in Fig. 16.

From the foregoing description, it will be seen that I have provided a simple effective means for carrying out the objects above stated. It will further be seen that the essence of the device and its operation may be summarized briefly as follows. An arch-fitting member is carried by means adapted to hold this member in correct location on a human foot. A pad-anchoring and securing member is carried by the device beneath the arch locator into the exact desired position within the shoe and the weight of the wearer, when applied to the arch locator, drives a securing means into the sole of the shoe, thus securing the anchor member. Upon release of the weight on the foot, and thus on the arch locator, the foot may be withdrawn, the action of securing the anchor having dislodged it from the carrying device and it is permitted to remain in position in the shoe while the foot is withdrawn with the device.

In one form, the anchor-securing means is locked in a position preventing pressure from dislodging the anchor while the foot moves into the shoe, and a releasing means becomes effective toward the end of this movement, unlatching the anchor-securing means, after which the weight of the person on the foot is free to effect the driving of the anchor-securing prongs.

In the other form of the device shown, the latching means for supporting the anchor-securing means is omitted while the anchor means itself is releasably held, and the driving means is prevented by spring action from dislodging the anchor until the person's weight is placed on the arch-locating element.

I claim:

1. A metatarsal arch-support locating and securing device comprising a supporting plate fitted to the bottom of a human foot, means for securing said plate to the foot, a carrier member rigidly fixed to said plate for removably holding an arch-support anchor member and an anchor securing plate having depending prongs thereon adapted to be driven downwardly through the anchor member into the sole of a shoe, a vertically movable slide in the carrier adapted to drive said prongs into the shoe sole, a driving cap rigidly mounted on said slide and shaped to fit beneath the metatarsal arch of the foot, and means for holding said slide and said anchor securing plate in raised position when the foot with the device secured thereto is inserted into the shoe, whereby the weight of the wearer on the driving cap will drive the anchor member firmly into the shoe sole.

2. The device described in claim 1 in which the carrier member is provided with a latch member movable longitudinally of the foot and with relation to the supporting plate, said latch member having a forwardly projecting element slidable on the carrier member and having a portion adapted to frictionally engage the inner sole surface of the shoe as the foot is moved into the shoe to effect release of said latch prior to the application of the weight of the wearer upon the driving cap.

3. A metatarsal arch locator and applying device for anchoring an element adapted to engage and hold an arch-supporting pad in correct position within the shoe of the wearer and including in combination, a supporting arm adapted to be fitted to the bottom of the foot and be located by curved portions beneath the metatarsal head and having wings embracing the sides of the bottom portion of the foot, adjustable means for tightly securing the supporting arm in position, an arch fitting and locating and driving cap member carried above the arm, a vertically movable member connected to said arch fitting member and having a driving head, said element for engaging and anchoring a pad having securing prongs adapted to be driven into the shoe by said driving member and by the weight of the wearer upon the arch-locating and driving cap member.

4. A device described in claim 3 in which the anchoring element and driving head are held against downward movement while the foot is being moved into the shoe, the means for so holding the anchoring element and vertically movable driving member comprising a slide longitudinally movable with relation to said supporting arm and having latching engagement with the driving member when in a forward position, means for withdrawing the slide from latching position consequent upon the foot with the device thereon being thrust into the shoe, said means comprising a forwardly extending member connected with the slide and slidable with relation to the arm and formed of resilient material biased to press downwardly and engage the inner surface of the sole of the shoe and having friction means at the shoe engaging portion causing relative rearward movement of the slide as the device moves into the shoe and thus releasing the anchor plate and head.

5. The device described in claim 3 having a resilient support for the arch locating member acting to hold the driving head in its upward position while the foot and device are thrust into the shoe but permitting the driving action by the weight of the wearer when in the shoe.

6. The device described in claim 3 having a support for the arch locating member for holding the driving head in its upward position while the foot and device are thrust into the shoe in which the pad anchoring element is formed of resilient material in the shape of a flat portion and upwardly extending side walls.

7. A metatarsal arch support locator and device for applying an element adapted to anchor and hold an arch supporting pad in correct position within the shoe, and comprising a supporting arm adapted to be fitted to the under side of the human foot and means for securing the supporting arm in adjusted position, and including an arch fitting and locating convex member vertically movably supported on said arm, means on the arm for removably carrying said anchoring element with the arm into a shoe, said anchoring element being provided with securing prongs adapted to be driven downwardly into the sole of the shoe, and a driving element for engaging the same movable downwardly by the weight of the wearer applied upon the convex arch fitting and locating member.

8. In a metatarsal arch-support locating and securing device comprising a supporting plate fitted to the bottom of a human foot, means for securing said plate to the foot, means on the plate shaped to detachably engage and hold an arch-support anchor member, and means adapted to be acted upon by the weight of a wearer for driving an anchor securing plate having depending prongs downwardly into the sole of the shoe to secure said anchor member thereto, said last-named means including a vertically movable element in fixed longitudinal and lateral relation to said supporting plate and having thereon a metatarsal arch fitting and locating cap in fixed relation to said anchor securing plate driving element and whereby it may force said depending prongs into the insole of the shoe when the weight of the wearer is applied to said plate and may simultaneously detach said arch-support anchor member from said supporting plate.

9. The device defined in claim 8 in which downwardly extending wall surfaces are provided on said supporting plate and shaped to embrace and carry non-circular resilient arch-supporting anchor members and which supporting surfaces have a predetermined relation to the position of the metatarsal arch fitting and driving cap, and whereby metatarsal arch-supporting pads may be located and anchored in correct relation to a foot.

No references cited.